E. C. WILSON.
PITMAN HEAD.
APPLICATION FILED APR. 29, 1908.
919,669.
Patented Apr. 27, 1909.
2 SHEETS—SHEET 2.
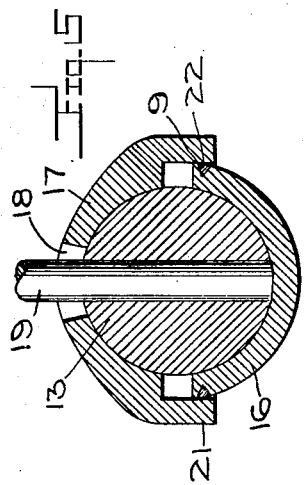
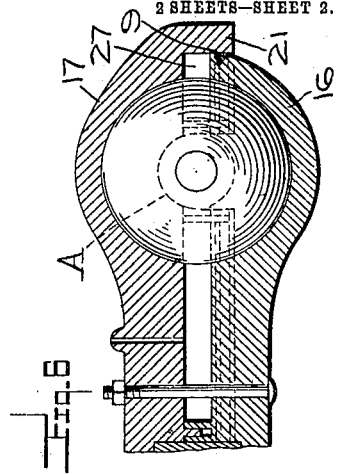
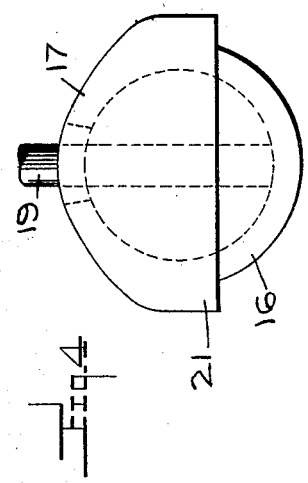
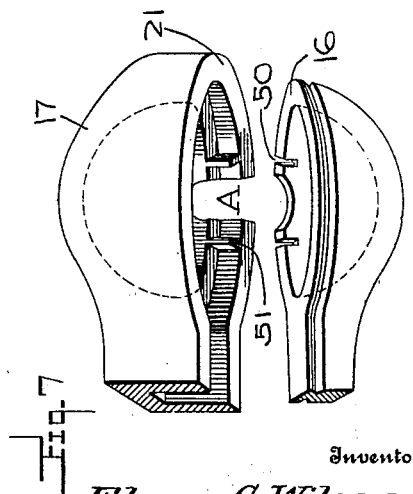
Witnesses
Ed. R. Lusby.
E. L. Chandlee.
Inventor
Elmer C. Wilson.
By Woodward + Chandlee
Attorney

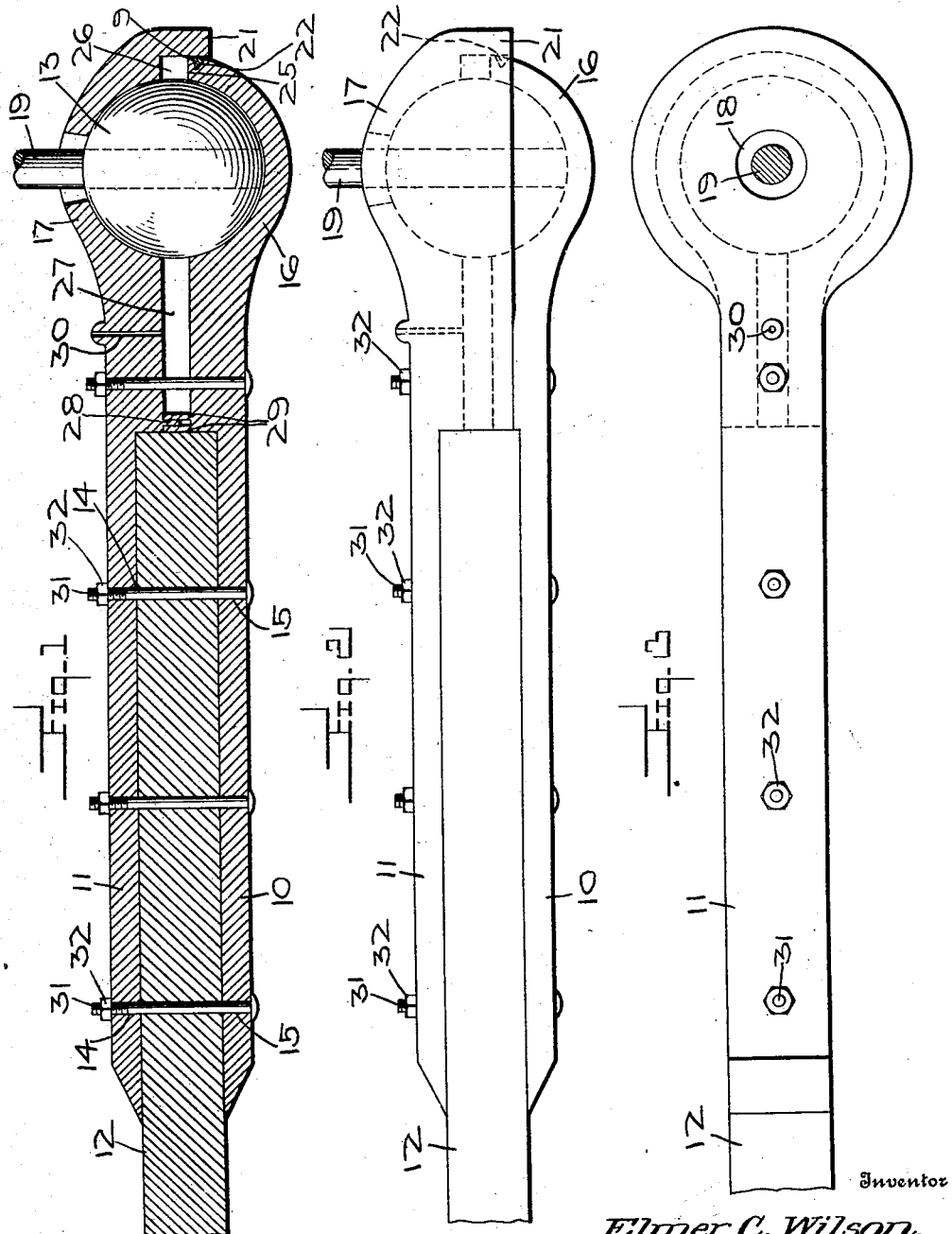

UNITED STATES PATENT OFFICE.

ELMER C. WILSON, OF OSKALOOSA, KANSAS.

PITMAN-HEAD.

No. 919,669.  Specification of Letters Patent.  Patented April 27, 1909.

Application filed April 29, 1908. Serial No. 429,965.

*To all whom it may concern:*

Be it known that I, ELMER C. WILSON, a citizen of the United States, residing at Oskaloosa, in the county of Jefferson and State of Kansas, have invented certain new and useful Improvements in Pitman-Heads, of which the following is a specification.

This invention relates to means for operating reciprocating parts, and particularly to connections for pitman heads, and has for its object to provide an improved form of ball and socket joint for pitman connections.

A particular object of the invention is to provide a device of this character having means for taking up the wear of the socket.

Another object is to provide an effective lubricating means.

Another object is to provide an effective means for retaining lubricant in the socket.

Another object is to provide a means for preventing the access of dust and dirt to the bearing portion.

Another object is to provide a device of this character that is adapted for use with pitman rods of various types.

Other objects and advantages will be apparent from the following description and it will be understood that changes in the specific structure shown and described may be made within the scope of the claims and that any suitable materials may be used without departing from the spirit of the invention.

In the drawings forming a portion of this specification, and in which like numerals of reference indicate similar parts in the several views, Figure 1 is a longitudinal sectional view of the device engaged upon the end portion of a wooden pitman rod, Fig. 2 is a side view from the same point as Fig. 1, Fig. 3 is a top view of the device, Fig. 4 is an end view, Fig. 5 is a cross sectional view through the ball and socket, Fig. 6 is a sectional view of a modified form of the socket for the device, Fig. 7 is a perspective view of the form shown in Fig. 6.

Referring to the drawings, there is shown a ball and socket joint comprising oppositely disposed sections 10 and 11 engaged with a pitman rod 12 and having a ball member 13 revolubly engaged therein outwardly of the pitman rod. The member 10 comprises a flat shank portion provided with longitudinally spaced openings 15 therethrough, and having a socket portion 16 of the usual type at its outer end. The upper member 11 comprises a shank portion having longitudinally spaced openings 14 formed therein in registry with those 15 in the member 10, and having at its outer end a socket portion 17. A concentric opening 18 is formed through the socket portion 16, and has revolubly engaged therethrough a wrist pin 19 carrying a ball member 20 engaged revolubly between the socket members, as shown. The socket portion 17 is provided with a circumferential outwardly offset flange 21 disposed in overlapping engagement with the socket portion 16 and adjacent portion of the shank 10 as shown. A groove 22 is formed in the outer surface of the socket portion 15 and the adjacent shank portion, the groove extending in spaced relation with the inwardly disposed edge of the member 10. The groove is intended to receive packing 9 therein to be engaged closely by the flange 21 to retain oil within the socket. It will be noted that the edges 25 and 26 of the bearing portions of the sockets 16 and 17 respectively are spaced from each other, an annular channel thus being formed around the ball member 13 and communicating with a space 27 between the adjacent end portions of the shanks 10 and 11. The inner end of the space 27 is closed by the engagement of a flange 28 carried by the member 11 engaging between two flanges 29 carried by the member 10 and having suitable packing material therebetween to form a yieldable closure.

Communicating with the space 27 there is an oil channel 30 formed in the adjacent shank portion of the member 11 through which it will be understood that oil may be introduced for lubrication of the socket portion. Bolts 31 are engaged through the openings 14 and 15 and the rod 12, as shown, and the members 10 and 11 secured in operative position by means of nuts 32 engaged over the bolts 31. It will be seen that when wear occurs in the sockets 16 and 17 the outer one of the nuts 32 may be tightened upon its relative bolt to bring the socket portions into closer engagement upon the ball 13.

In Fig. 6 there is shown a socket of a similar type to that illustrated in Figs. 1 to 5 inclusive, with the exception that an opening is formed in one side of the socket at the junction of the socket portions 16 and 17. A recess 50 is formed in the edge of the member 16 on each side of the opening, and flanges 51 are formed upon the inner side of the offset portion 21 for sliding engagement in the recesses 50, to close the oil passage 27 extending around the socket. It will be seen that ingress of dust to and egress of oil from the passage 27 are thus prevented. This form of socket may be deemed preferable in a large number of uses, because of the greater ease of attaching the socket around a ball and wrist pin.

Engaged under the nut 31' there is a band spring 53 having a slot formed therein disposed slidably around the bolt 30, the opposite end of the spring being arranged to engage the outer nut 31 to hold it against disengagement, and consequent loosening of the adjustment between the socket portions 16 and 17, disengagement of the spring from the nut 31 being accomplished by pressing the adjacent end of the spring downwardly into a recess 60, formed in the face of the section 11.

What is claimed is:

1. An article of the class described comprising a ball portion, oppositely disposed socket sections having said ball engaged therebetween, one of said sections having a groove in its outer surface, the other of said sections having a flange disposed in overlapping engagement over said first named section, and packing material engaged closely in said grooves and against said flange.

2. An article of the class described comprising a ball member, oppositely disposed spaced socket sections having said ball engaged revolubly therebetween, one of said sections having a groove formed in its outer surface, the other of said sections having a flange disposed in overlapping engagement with the groove, packing material engaged in the groove, and against said flange, one of said sections having an oil passage formed therethrough and communicating with the space between said sections and means for tightening the engagement of said sections upon the ball member.

3. An article of the class described comprising a ball portion, oppositely disposed socket sections revolubly engaged with said ball portion, the adjacent edges of said sections being spaced from each other, one of said sections having a flange disposed slidably over the opposite section to retain oil in the space between the sections.

4. A pitman head adapted for detachable engagement with pitman rods, and comprising opposite socket sections adapted to engage with a ball member with their adjacent edges in spaced relation, an oil passage being formed through one of the sections communicating with the space between the sections, one of the sections having an outwardly offset projecting flange adapted to engage slidably over the adjacent section to prevent access of dust to an engaged ball and to retain a lubricant therein.

5. An article of the class described comprising oppositely disposed socket portions adapted for adjustable engagement over a ball member carrying a wrist pin, said sections being adapted to present their adjacent edges in spaced relation when so engaged, one of said sections having an outwardly offset flange adapted to engage slidably over the opposite section to prevent the ingress of dust between the sections or the escape of lubricant from therebetween, one of said sections having an oil passage formed therethrough communicating with the space between the sections, means for securing the sections in detachable coengaged position, said article being adapted for detachable engagement with a pitman rod.

In testimony whereof I affix my signature, in presence of two witnesses.

ELMER C. WILSON.

Witnesses:
LESLIE CLAY,
HARRY J. CLARK.